United States Patent
Srinivasamurthy et al.

(10) Patent No.: US 11,086,950 B2
(45) Date of Patent: Aug. 10, 2021

(54) SYSTEM AND METHOD FOR TASK GENERATION TO ADDRESS ARTICLE FEEDBACK

(71) Applicant: ServiceNow, Inc., Santa Clara, CA (US)

(72) Inventors: Padmaprabodh Ambale Srinivasamurthy, Hyderabad (IN); Ganapathi Subramanian Balasubramanian, Hyderabad (IN); Sarup Paul, Pleasanton, CA (US); Jiten Goyal, Hyderabad (IN); Maria Svoisky Goldberg, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 387 days.

(21) Appl. No.: 15/971,807

(22) Filed: May 4, 2018

(65) Prior Publication Data

US 2019/0340300 A1    Nov. 7, 2019

(51) Int. Cl.
| | |
|---|---|
| *G06F 16/953* | (2019.01) |
| *G06F 16/9535* | (2019.01) |
| *G06F 9/48* | (2006.01) |
| *G06F 16/23* | (2019.01) |
| *G06F 16/335* | (2019.01) |
| *G06F 16/33* | (2019.01) |

(52) U.S. Cl.
CPC ........ *G06F 16/9535* (2019.01); *G06F 9/4843* (2013.01); *G06F 16/23* (2019.01); *G06F 16/335* (2019.01); *G06F 16/3334* (2019.01)

(58) Field of Classification Search
None
See application file for complete search history.

(56) References Cited

U.S. PATENT DOCUMENTS

| | | | |
|---|---|---|---|
| 6,609,122 B1 | 8/2003 | Ensor | |
| 6,865,268 B1 * | 3/2005 | Matthews | ............. G06Q 10/10 379/265.02 |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |

(Continued)

OTHER PUBLICATIONS

ServiceNow. "Knowledge feedback (Jakarta)," https://docs.servicenow.com/bundle/jakarta-servicenow-plafform/page/product/knowledge-management/reference/r_KnowledgeFeedback.html. Updated Jun. 15, 2017, last accessed May 4, 2018.

(Continued)

*Primary Examiner* — Howard Cortes
(74) *Attorney, Agent, or Firm* — Fletcher Yoder PC

(57) ABSTRACT

The present approach relates to receiving feedback corresponding to an article provided from a knowledge base. The knowledge base includes a plurality of articles, and the feedback includes one or more feedback inputs. The one or more feedback inputs may be processed with one or more respective task generation rules. A task is generated to address the feedback corresponding to the article if the one or more feedback inputs does not satisfy the one or more respective task generation rules. An action may be received in response to the generated task, and the knowledge base updated based at least in part on the received action.

20 Claims, 10 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,616,896 B2 * | 12/2013 | Lennox ............... G06F 16/285 |
| | | 434/322 |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,783 B2 | 6/2015 | Ding |
| 9,122,552 B2 | 9/2015 | Whitney |
| 9,239,857 B2 | 1/2016 | Trinon |
| 9,535,737 B2 | 1/2017 | Joy |
| 9,672,252 B2 * | 6/2017 | Landry ............... G06F 11/0706 |
| 9,792,387 B2 | 10/2017 | George |
| 9,823,993 B2 * | 11/2017 | Anand ................. G06F 16/245 |
| 10,031,799 B1 * | 7/2018 | Young ................ G06F 11/0709 |
| 10,410,219 B1 * | 9/2019 | El-Nakib .......... G06F 16/90332 |
| 10,681,212 B2 * | 6/2020 | Sanghavi ............ H04L 65/1069 |
| 2004/0153428 A1 | 8/2004 | Reid et al. |
| 2006/0271591 A1 * | 11/2006 | Murphy .............. G06F 11/0769 |
| 2007/0038754 A1 * | 2/2007 | Nunez ................... G06Q 10/10 |
| | | 709/226 |
| 2007/0143239 A1 * | 6/2007 | Boyle ..................... G06N 5/04 |
| | | 706/45 |
| 2007/0288800 A1 * | 12/2007 | Chavez, Jr. ............... G06F 1/28 |
| | | 714/39 |
| 2008/0040299 A1 * | 2/2008 | Faihe .................. G06F 11/2257 |
| | | 706/14 |
| 2010/0161389 A1 * | 6/2010 | Arning ..................... G06N 5/04 |
| | | 705/7.11 |
| 2010/0223157 A1 * | 9/2010 | Kalsi ...................... G06Q 30/06 |
| | | 705/26.1 |
| 2013/0117203 A1 * | 5/2013 | Malka ................. G06Q 10/067 |
| | | 706/12 |
| 2013/0117267 A1 * | 5/2013 | Buryak ................. G06F 16/435 |
| | | 707/737 |
| 2016/0239487 A1 * | 8/2016 | Potharaju ................ G06F 16/93 |
| 2017/0005967 A1 * | 1/2017 | Simpson .............. G06Q 10/101 |
| 2017/0161243 A1 * | 6/2017 | Manoraj ............. G06F 11/0775 |
| 2017/0235628 A1 * | 8/2017 | Nguyen .............. G06F 11/0781 |
| | | 714/37 |
| 2019/0303436 A1 * | 10/2019 | Kataoka ................. H03M 7/30 |

OTHER PUBLICATIONS

Catalano, Phil. "Knowledge Management Feedback," https://blogs.oracle.com/portalsproactive/knowledge-management-feedback-v2, May 29, 2013, last accessed May 4, 2018.

* cited by examiner

KNOWLEDGE FEEDBACK TASK
KFT# 888333

NOTIFICATION OF ACTION TO RESOLVE

| TASK NUMBER — 152 | STATE — 158 |
|---|---|
| KFT# 888333 | RESOLVED |
| SUBMITTED BY — 154 | ASSIGNED TO — 160 |
| JOHN DOE | SYSTEM ADMINISTRATOR |
| ARTICLE — 106 | RESOLUTION CODE — 162 |
| KB123789 | UPDATED ARTICLE |
| REASON — 156 | OUTCOME — 164 |
| INCORRECT INFORMATION | |

DESCRIPTION — 156

KB123789 WAS MARKED AS CONTAINING INCORRECT INFORMATION. COMMENT STATED THAT OPTION 3 IS UNAVAILABLE AFTER LAST SYSTEM UPDATE.

RESOLUTION NOTES — 168

RESOLVED

[VIEW ACTION] — 204

COMMENT — 202

[POST] — 206

ACTIVITY — 208

| SYSTEM ADMINISTRATOR | 04/25/2018 |
| UPDATED ARTICLE BASED ON JOHN DOE FEEDBACK. | |
| JOHN DOE | 04/23/2018 |
| FEEBACK NOTED INCORRECT INFORMATION | |
| WAYNE WEBB | 04/19/2018 |
| UPDATED ARTICLE | |
| WAYNE WEBB | 01/02/2018 |
| CREATED ARTICLE | |

[ACCEPT] — 210  [REJECT] — 212

*FIG. 9*

SYSTEM AND METHOD FOR TASK GENERATION TO ADDRESS ARTICLE FEEDBACK

BACKGROUND

The present disclosure relates generally to the use of articles in a knowledge base, and more particularly to the use of feedback about an article to generate a task related to the article.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data).

Such technology intensive environments, however, may have users who have questions in particular application or hardware contexts or more generally need guidance with respect to the use of the available resources. In view of this need for guidance, knowledge bases may be made available to users to help answer questions or otherwise resolve issues they are faced with. Such knowledge bases help facilitate the sharing of information among users as they may contain articles related to common or known questions or issues and also facilitate the sharing of information and suggestions between users via posting and comment functionality. Thus, articles within a knowledge base may provide users with information such as self-help and troubleshooting. Occasionally, however, an article or post within a knowledge base may fail to satisfactorily address an issue faced by a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A knowledge base supported by a cloud-based platform may be accessible to users seeking solutions related to topics within the knowledge base. Some users may provide feedback corresponding to an article they view, where the feedback may include an indication on whether the article was helpful, a rating of the article, text comments on the article, or any combination thereof. An evaluation or processing of the feedback with task generation rules may determine whether the feedback should be addressed by a knowledge manager. Upon determination that the feedback should be addressed, a task for the knowledge manager may be generated and assigned to the knowledge manager. The knowledge manager may review the article and the feedback to determine the appropriate action to address the feedback. The appropriate action may include, but is not limited to, requesting supplemental feedback from the user, creating a new article for the knowledge base, updating the article with additional details or explanation, correcting one or more portions of the article, retiring the article, or noting why no other action is to be taken. The knowledge base may be updated based on the action by the knowledge manager. In some embodiments, the user is notified of the action, and the user may indicate an acceptability of the action. In some embodiments, the cloud-platform may facilitate a dialogue between the user and the knowledge manager to enable refinements of the actions by the knowledge manager to sufficiently address the feedback by the user. Through the actions addressing the feedback provided by users, the knowledge manager may improve the scope, quality, and relevancy of the knowledge base.

BRIEF DESCRIPTION OF THE DRAWINGS

Various aspects of this disclosure may be better understood upon reading the following detailed description and upon reference to the drawings in which:

FIG. 9 is a user interface of a communication to the user corresponding to the action performed by the knowledge manager in response to the feedback corresponding to the article from the user, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A knowledge base supported by a cloud-based platform may be accessible to users seeking solutions related to topics within the knowledge base. Some users may provide feedback about articles they view, where the feedback may include an indication on whether an article was helpful, a rating of the article, text comments on the article, or any combination thereof. The feedback may be processed (e.g., evaluated) with task generation rules, and a task may be automatically generated for a knowledge manager to address the feedback. To address the feedback, the knowledge manager may take an action, such as creating a new article, updating the article, retiring the article, requesting supplemental feedback from the user, or noting why no other action is to be taken. The knowledge base may be updated based on the action by the knowledge manager. In some embodiments, the task may be closed after the action is accepted by the user or after an elapsed time since the article was updated. Through the actions addressing the feedback provided by users, the knowledge manager may improve the scope, quality, and relevancy of the knowledge base.

Figure 1:
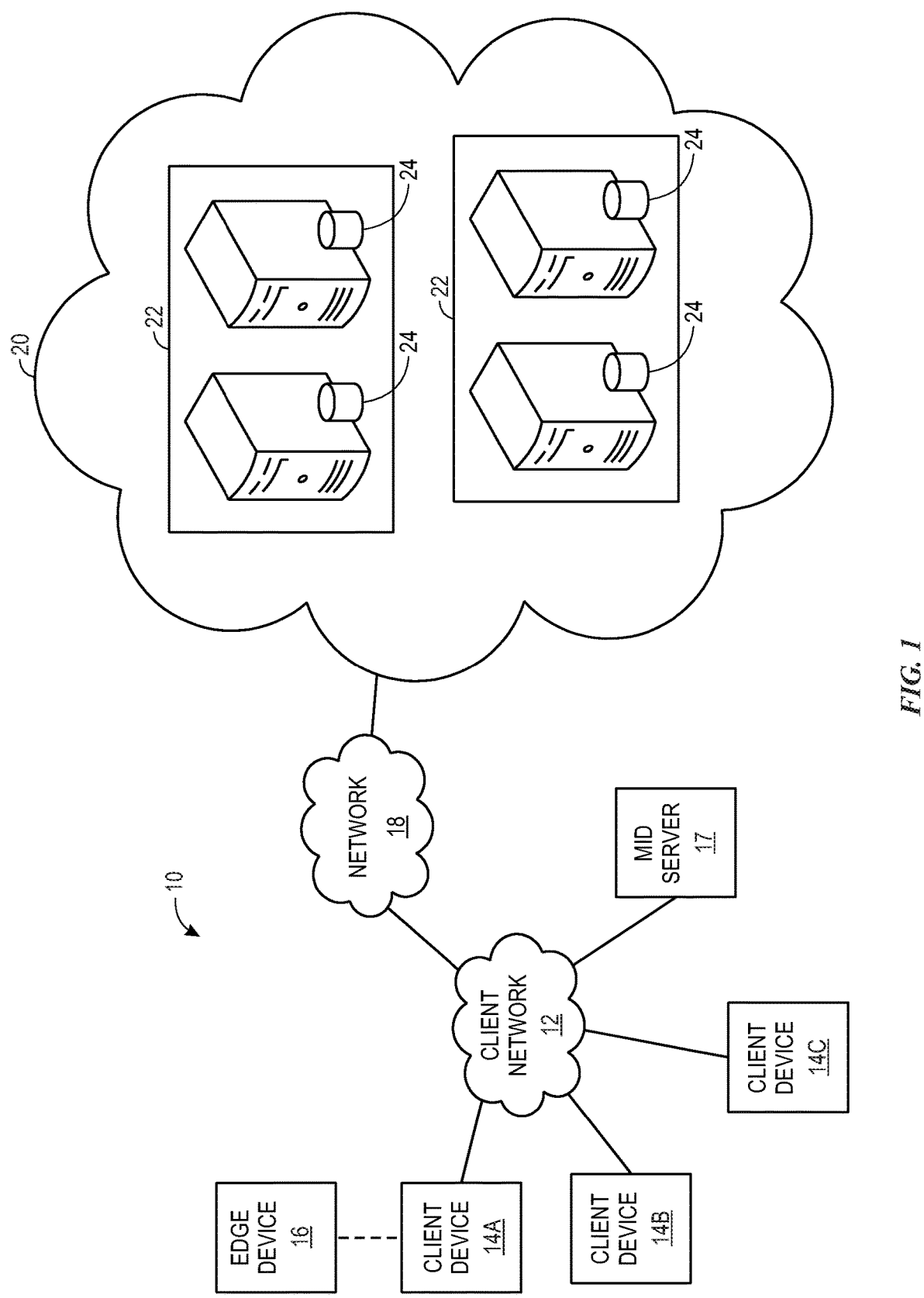
FIG. 1 is a block diagram of an embodiment of a cloud computing system in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
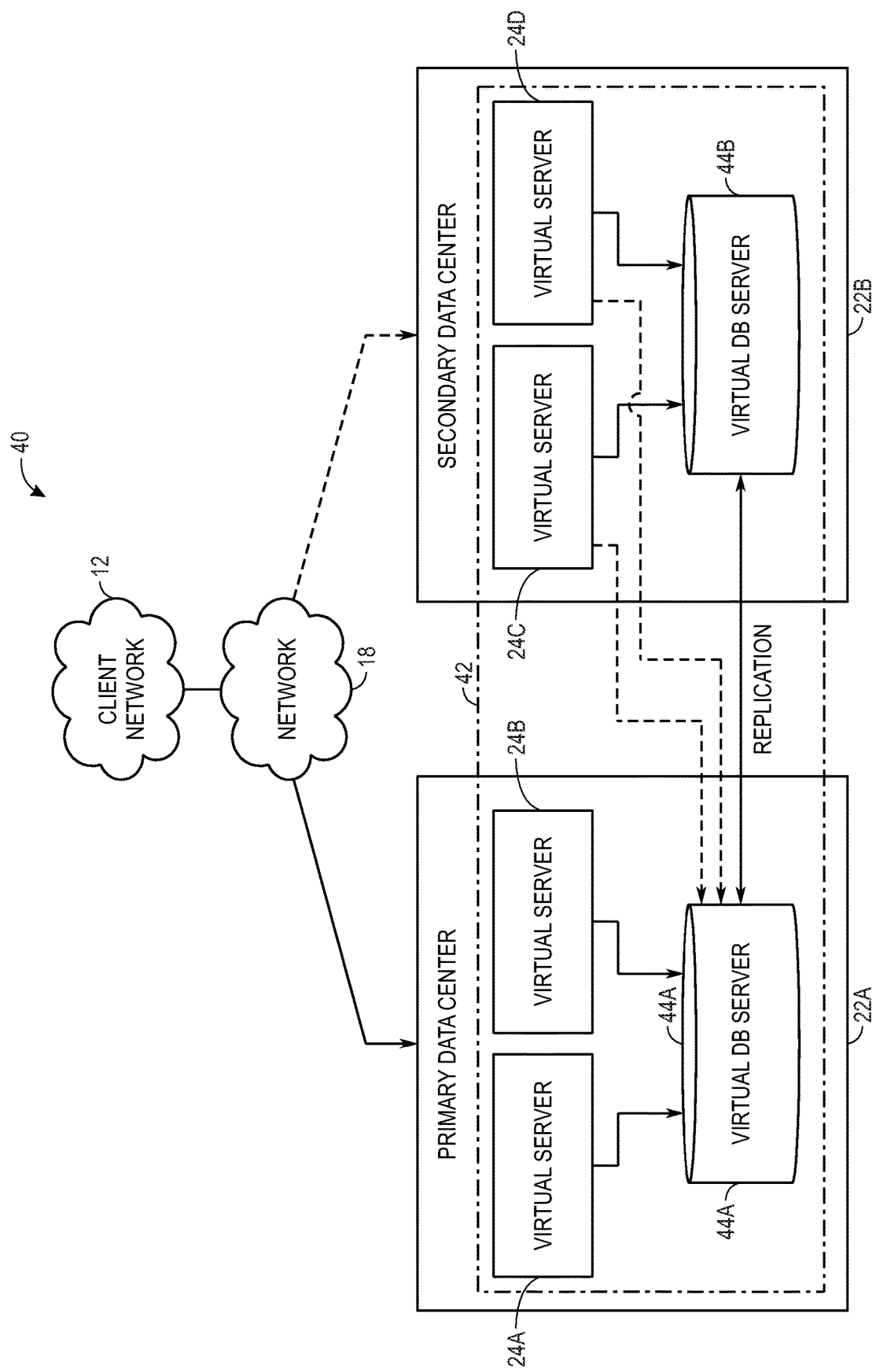
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
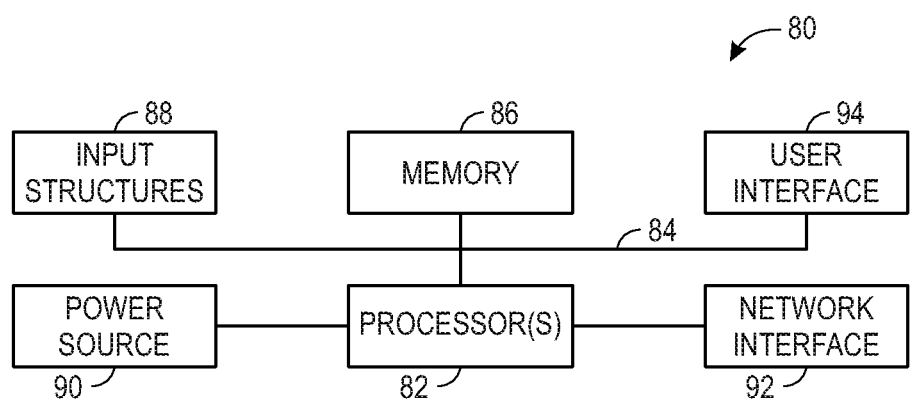
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
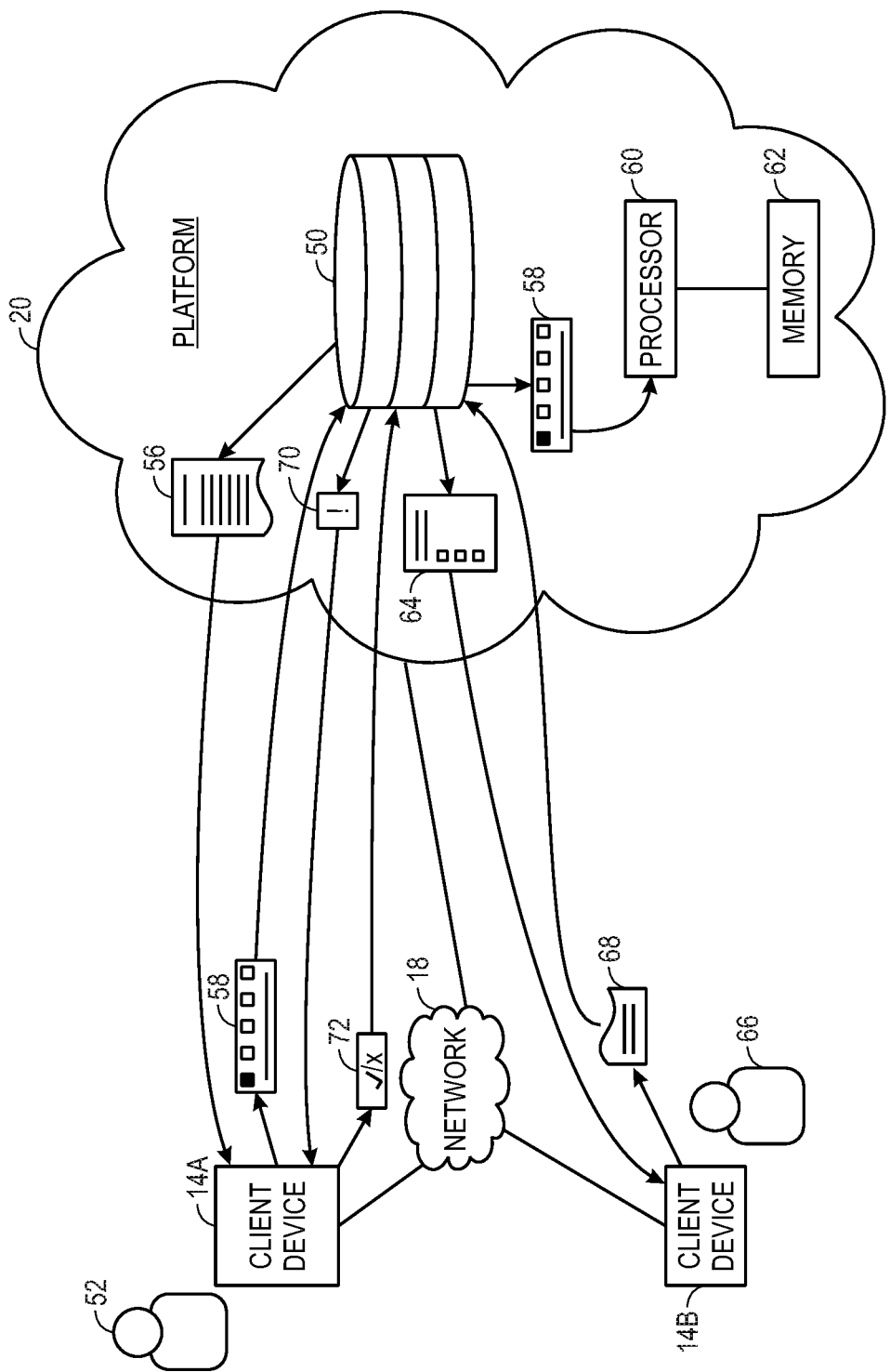
FIG. 4 is a block diagram of an embodiment of a platform that supports user feedback on articles from a knowledge-base and actions by another to update the knowledge base in response to the feedback, in accordance with an embodiment.

FIG. 4 is a block diagram of an embodiment of the computing system 10 with the cloud-based platform 20 that supports a knowledge base 50 accessible by one or more users 52 via client devices 14. The knowledge base 50 may be hosted by or implemented using one or more physical or virtual servers of the cloud-based platform 20, such as a virtual server 24 and/or database server 44. The knowledge base 50 may include a plurality of articles across one or more topics. In some embodiments, the knowledge base 50 is a relational database that relates a plurality of fields with each record and which may be interrelated with one or more other records of the relational database. For example, fields for an article of the knowledge base 50 may include one or more topics directly related to or mentioned in the article, one or more secondary topics that are indirectly related to or tangential to topics mentioned in the article, an author, a creation date, a revision date, a rating, a usefulness indicator, a feedback history, and feedback notes, among others. A user 52 may access an article 56 within the knowledge base 50 via a respective client device 14 connected to the cloud-based platform 20, such as via an instance 42 hosted or generated by the platform 20. As discussed in detail below, the user 52 may provide feedback 58 corresponding to the article 56 to the cloud-based platform 20. A processor 60 of the cloud-based platform 20 may process (e.g., evaluate) the received feedback 58 with task generation rules stored in a memory 62 to determine if a task 64 is to be generated. A knowledge manager 66 may access the generated task 64 via the same client device 14 or another client device 14 connected to the cloud-based platform 20. As discussed in detail below, the knowledge manager 66 may provide an action 68 to the cloud-based platform 20 to address the feedback 58 in response to the assigned task 64.

In some embodiments, the cloud-based platform 20 may communicate a notification 70 of the action 68 to the user 52. In some embodiments, the cloud-based platform may communicate the notification 70 of the action via an email, text message, or the user's portal to the cloud-based platform 20, or any combination thereof. As discussed in detail below, the cloud-based platform 20 may use the action 68 to update the knowledge base 50, such as by creating a new article 56, updating the article 56, or retiring the article 56. In some embodiments, the knowledge base 50 may be updated with an explanation for an article 56 about why no other action is to be taken to address particular feedback from a user. In some embodiments, the knowledge base 50 may be updated based at least in part on supplemental feedback 72 provided by the user 52 upon review of the action. For example, the user 52 may indicate that the action 68 addresses the initial feedback 58 and provide a user acceptance of the action 68 as the supplemental feedback 72.

Figure 5:
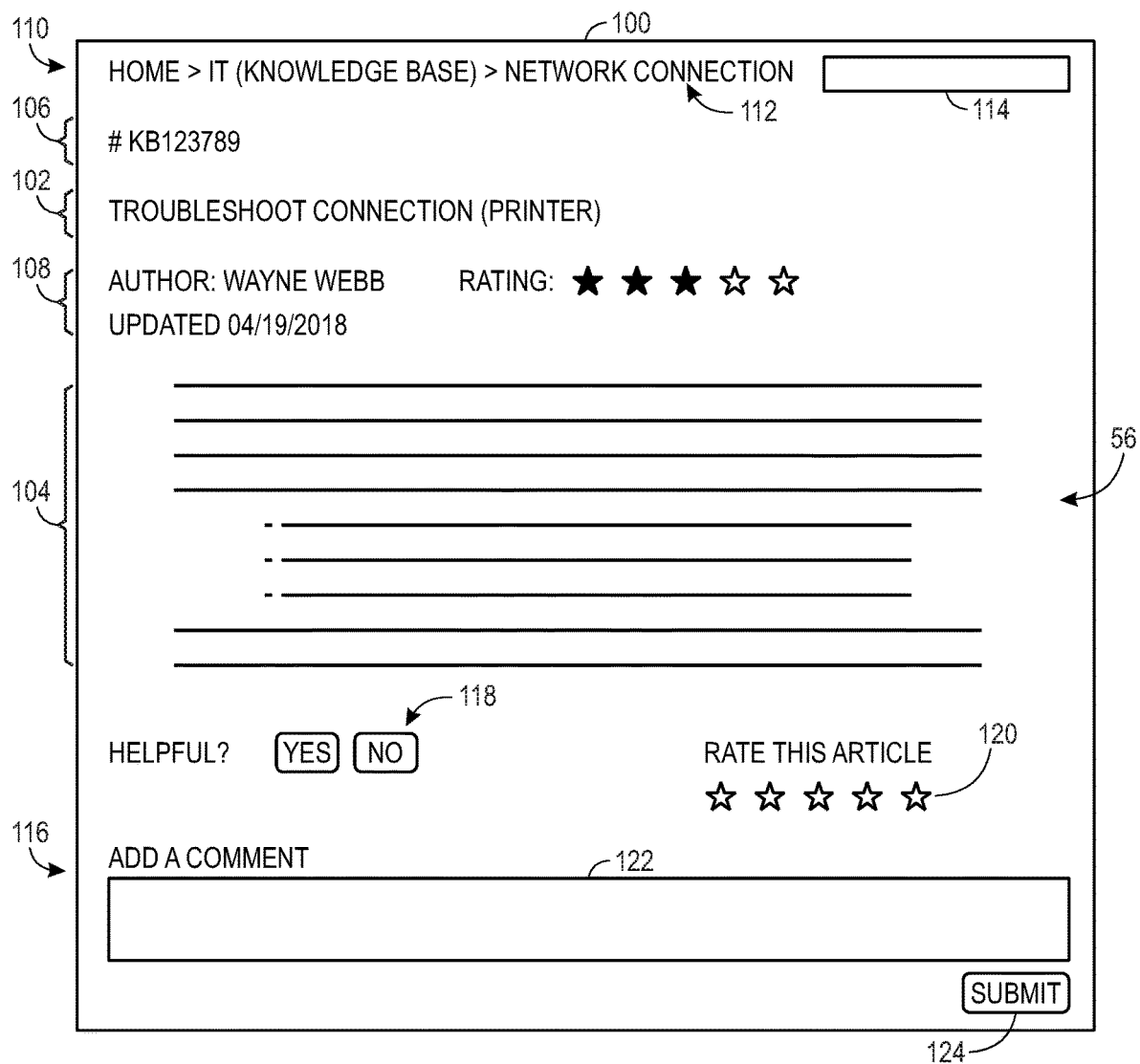
FIG. 5 is a user interface that supplies an article to a user from the knowledge base and facilitates feedback corresponding to the article from the user, in accordance with an embodiment.

FIG. 5 illustrates an embodiment of a user interface 100 that displays an article 56 to the user 52 from the knowledge base 50. Various fields associated with the article 56 may be displayed on the user interface 100. For example, the user interface 100 may display a title 102, a body 104, an article identifier 106, and one or more article attributes 108. The article attributes 108 may include, but are not limited to, the article author, the article category, the article creation date, the article revision date, the average article rating, and the article views. In some embodiments, a navigation portion 110 of the user interface 100 may display a directory structure 112 and a search box 114. The user 52 may utilize the navigation portion 110 to navigate among articles within the knowledge base 50.

Upon review of the article 56, the user 52 may provide feedback corresponding to the article 56 via a feedback portion 116 of the user interface 100. The user 52 may provide one or more types of feedback corresponding to the article 56, such as a helpfulness indicator, a rating, and comments, or any combination thereof. In some embodiments, a feedback threshold may require the user 52 to provide multiple feedback inputs, such as a helpfulness indicator and a rating or a rating and a comment. The user 52 may provide the helpfulness indicator via a helpfulness input 118 (e.g., button, check box). The helpfulness indicator may reflect qualitative feedback of user satisfaction with the article 56. The user 52 may provide the rating via a rating input 120. Although the rating input 120 is illustrated as an input range (i.e., between 1-5 stars), it may be appreciated that the rating input 120 may be another input (e.g., slider, numerical input) that facilitates quantitative feedback of user satisfaction with the article 56. The user 52 may provide text input (e.g. comments) via the text box 122. Upon selection of a Submit input 124, the cloud-based platform 20 may associate the user 52 and the article 56 with the one or more feedback inputs received via the feedback portion 116.

The cloud-based platform 20, or routines or an application executing on the platform, may process the feedback inputs with one or more respective task generation rules. The task generation rules may be used to process (e.g., evaluate) the feedback inputs and determine whether the feedback should be addressed by a knowledge manager via a task assigned to the knowledge manager. In some embodiments, the cloud-based platform 20 may support the assignment of tasks to virtual knowledge managers in place of or in addition to human knowledge managers. A virtual knowledge manager may be configured to automatically address particular types of feedback (e.g., typographical article errors), or to utilize a machine-learning algorithm to learn from histories of the resolution of other tasks for articles within the knowledge base. The task generation rules may determine that negative feedback should be addressed by a knowledge manager. In some embodiments, feedback may be evaluated as "negative feedback" if the feedback includes the helpfulness input 118 indicating the article as unhelpful, the rating input 120 being less than 3/5, or any combination thereof. That is, an "unhelpful" helpfulness input 118 may not satisfy a helpfulness task generation rule, and a rating input 120 less than 3/5 may not satisfy a rating task generation rule. It may be appreciated that the task generation rules may be adjusted by a knowledge manager or an administrator of the cloud-based platform 20 to configure the thresholds for what is evaluated as negative feedback. For example, the task generation rules may be adjusted based on an availability of knowledge managers or a quality of the feedback. Higher satisfaction thresholds for the task generation rules may increase the quantity of tasks assigned to knowledge managers and/or may increase the quality or relevancy of the articles within the knowledge base. Moreover, a different scale (e.g., 1 to 10 or 1 to 100) for the rating input 120 would be evaluated by a respectively different task generation rule than for a rating input with a 1 to 5 scale, as shown in FIG. 5.

In some embodiments, the cloud-based platform 20, routines, or an application executing on the platform, may execute a sentiment analysis rating of a text input (e.g., comment) to determine a sentiment of the text input. The sentiment analysis may analyze the text input for keywords or word combinations associated with negative feedback, and give a sentiment score to the text input. For example, the task generation rules may include a threshold sentiment score, where text inputs scored less than the threshold sentiment score are evaluated as not satisfying a task generation rule for sentiment analysis.

Figure 6:
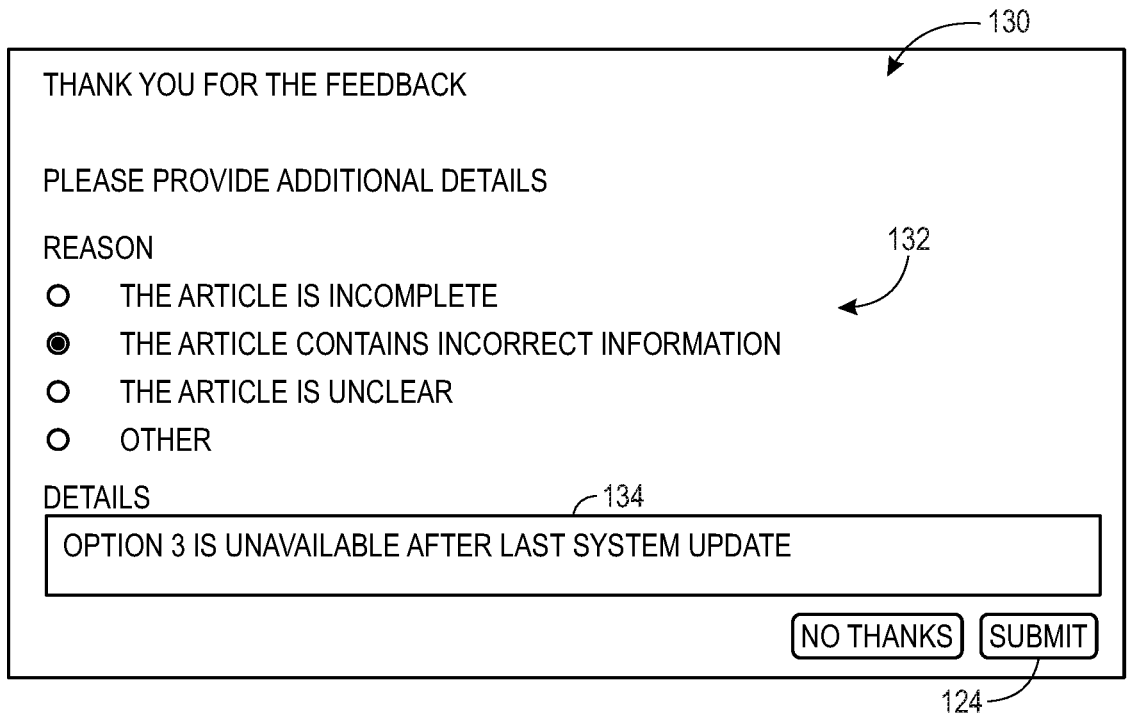
FIG. 6 is user interface that requests supplemental feedback from the user corresponding to the article, in accordance with an embodiment.

In some embodiments, the cloud-based platform 20, routines, or an application executing on the platform, may process the feedback upon selection of the Submit input 124, and request supplemental feedback from the user when the feedback inputs do not satisfy one or more of the task generation rules. FIG. 6 illustrates a request 130 for supplemental feedback from the user. The request may include predetermined reasons 132 for selection by the user, a supplemental text input 134 to receive details of reasons for the negative feedback corresponding to the article, or any combination thereof. Upon selection of the Submit input 124, the cloud-based platform 20 may associate the supplemental feedback from the request 130 with the one or more feedback inputs from the feedback portion 116 of the article 56.

Figure 7:
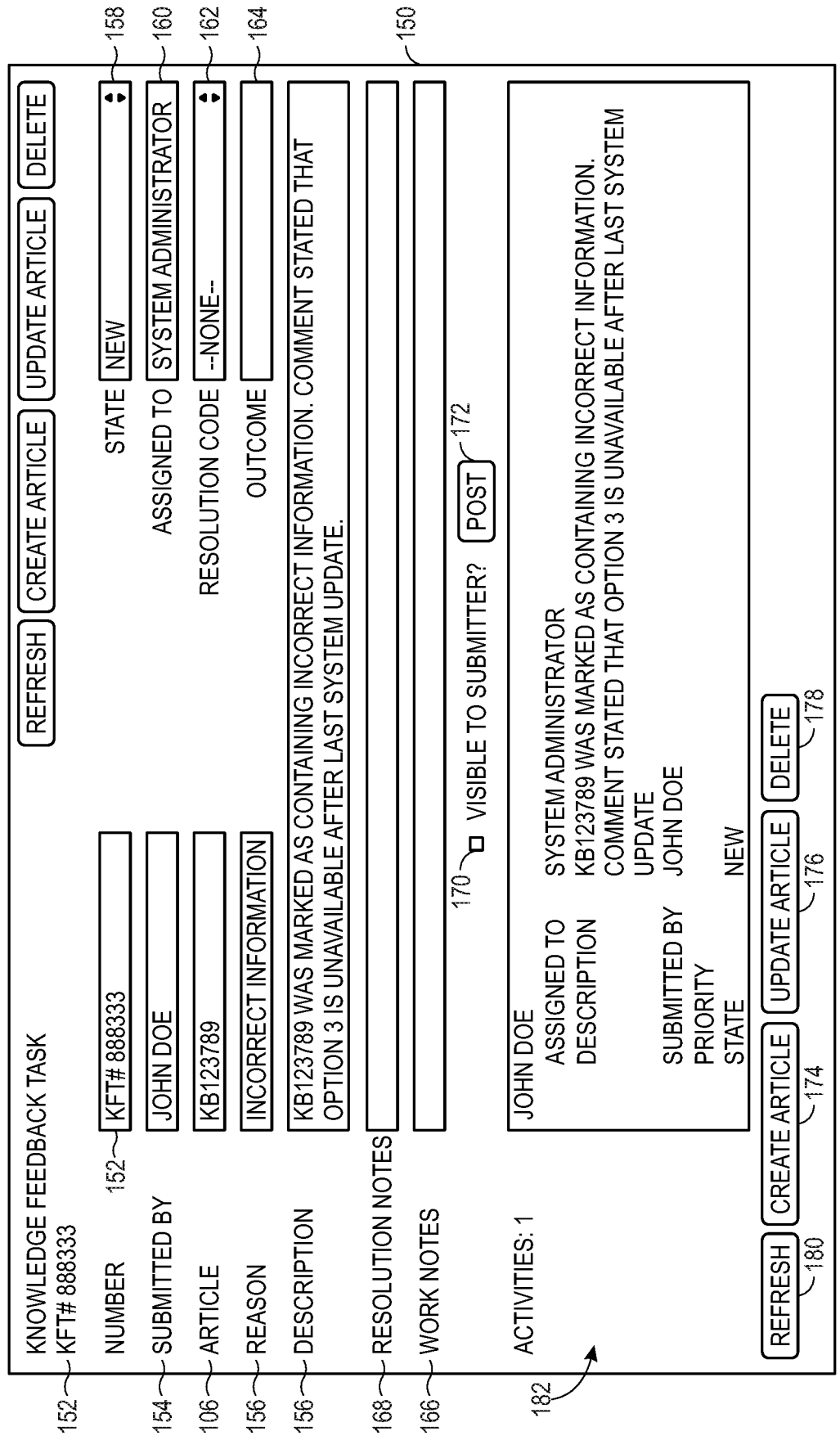
FIG. 7 is a user interface generated for a knowledge manager in response to a task generated based on the user feedback corresponding to the article, in accordance with an embodiment.

As discussed above, processing of the feedback inputs (including any supplemental feedback) with task generation rules may cause a task to be generated for a knowledge manager to address the feedback from the user. FIG. 7 illustrates an embodiment of a task interface 150 generated for the knowledge manager assigned to the task 64 to address the feedback 58 corresponding to the article. The task interface 150 may display a task number 152, the submitter 154 of the feedback 58, the article identifier 106, and a feedback summary 156. The feedback summary 156 may include the one or more feedback inputs from the feedback portion 116 of the article 56 and any supplemental feedback from the user, such as from the request 130. It may be appreciated that the knowledge manager may be assigned multiple tasks during a work period. The knowledge manager may review and perform actions for various assigned tasks in any order or concurrently, such as if multiple tasks relate to the same article. In some embodiments, a knowledge manager may delegate the original author of the article or another reviser to revise the article or to create a new article. Those delegated to create a new article or to revise the article may provide the respective action to the knowledge manager for the knowledge manager to submit to the cloud-based platform 20 via the task interface 150.

The task interface 150 may display various task parameters associated with the task 64. A task state 158 identifies the current status of the task 64 for the knowledge manager. For example, the task state 158 may be "New" when the feedback is initially processed and the task 64 is generated for feedback that does not satisfy one or more of the task generation rules. After the knowledge manager reviews the task 64, the task state 158 may change to "Work in progress" to reflect that the knowledge manager is aware of the task and is working towards completing an action in response to the generated task. For example, the task state "Work in progress" may identify when the knowledge manager is performing research in preparation for the appropriate action, creating a new article, updating the article, explaining why no action should be taken, or preparing a request for additional information from the user. The task state 158 "Awaiting information" may reflect when the cloud-based platform 20 or routines/applications executing on the platform have sent a request to the user to clarify one or more issues for the knowledge manager before additional action is taken. For example, the knowledge manager may communicate a request for supplemental feedback similar to the request 130 discussed above with FIG. 6. Additionally, or in the alternative, the knowledge manager may modify the task state 158 to "Awaiting information" to submit a request (e.g., the request 130) for supplemental feedback from the user.

The task state 158 "Resolved" may reflect when the knowledge manager has submitted an action to the cloud-based platform 20 to address the feedback. In some embodiments, the task state 158 may change from "Resolved" to "Work in Progress" or "New" if the user that provided the feedback does not accept the action. In some embodiments, the task state 158 "Closed" may occur when the action is accepted by the user that provided the feedback. In some embodiments, the task state 158 "Closed" may be appropriate without explicit acceptance by the user, such as when the action prepared by the knowledge manager clearly addresses the feedback provided by the user. For example, the task state 158 may be changed to "Closed" immediately upon submission of an action by the knowledge manager to address feedback about typographical errors or feedback with a detailed update to the article that the knowledge manager agrees is appropriate. The task state 158 "Closed" may reflect when the feedback corresponding to the article has been addressed, yet neither the article was updated nor a new article created. Moreover, a task may be closed after the knowledge manager provides an explanation why a suggestion in the feedback is incorrect or after a predefined time period (e.g., 1 week, 1 month) has elapsed since a request for supplemental feedback without a response from the user.

The task interface 150 may indicate the assigned knowledge manager 160 for the task. The knowledge manager may be assigned to the task based on a topic of the article 56, a priority of the feedback, an availability of a particular knowledge manager of a plurality of knowledge managers, among other reasons. Factors that may affect the priority of the feedback when the task is generated may include, but are not limited to, the quantity of feedback (i.e., detailed suggestion/question or only marked as "unhelpful), the type of feedback (i.e., feedback noting substantive error or feedback noting typographical error), a feedback history of the user providing the feedback, or an importance of the topic in the knowledge base (i.e., an article with many page views may be more important than an article with fewer page views). A task with a higher priority may be assigned to be completed by a knowledge manager prior to at least some tasks with a lower priority.

As discussed in detail below, the assigned knowledge manager may perform various actions in response to the generated task to address the feedback. A resolution code 162 may identify which action was taken by the knowledge manager. For example, the resolution code 162 "—None—" may be the default code for new tasks and tasks that are in progress. The resolution code 162 "Updated Article" identifies when the knowledge base 50 is updated to address the feedback by updating the article 56 itself, whereas the resolution code 162 "Created Article" identifies when the knowledge base 50 is updated to address the feedback by the creation of a new article. The resolution code 162 "Updated Search Configuration" may be used when the knowledge manager determines that the article content is correct yet the resolution sought by the user that provided the feedback corresponding to the article should be redirected to another article. In that situation, the knowledge manager may update keywords or topics associated with the article 56 to reduce or eliminate future anomalous feedback. The resolution code 162 "No Action" may be used when the action by the knowledge manager is an explanation about why no update to the article or new article should be undertaken to address the feedback. It may be appreciated that other resolution codes 162 may reflect other actions performed by the knowledge manager in response to the task 64. An outcome 164 may identify whether the user that provided the feedback accepted the action by the knowledge manager.

Work notes 166 on the task interface 150 may receive notes from the knowledge manager while working on the action. For example, the work notes 166 may include research performed by the knowledge manager, logs of activities performed by the knowledge manager, and so forth. The knowledge manager may use a visibility input 170 to control whether the user may view the work notes 166 while the knowledge manager is working on the task 64 or after the action is submitted by the knowledge manager. When the knowledge manager enables the user to view the work notes 166, a post control 172 may update the knowledge base 50 with the work notes 166 for the user to access via the cloud-based platform. Resolution notes 168 on the task interface 150 may reflect supplemental feedback from the user on a previously proposed action (e.g., update to an article, new article). Additionally, or in the alternative, the resolution notes 168 may include the explanation why no action has been taken by the knowledge manager to address the feedback corresponding to the article.

As discussed above, the knowledge manager may address the feedback corresponding to the article by creating a new article, updating the article, or retiring (e.g., deleting) the article. Accordingly, the knowledge manager may select a create article control 174 to perform the action of creating a new article to address the feedback. Selection of the create article control 174 may open a new window for the knowledge manager to create the new article. In some embodiments, a field associated with the new article in the knowledge base may associate the new article created as an action with the particular article 56 that prompted the new article. Additionally, or in the alternative, a new article may be associated in the knowledge base as a supplemental article for the particular article 56 that prompted the user to provide the feedback that generated the task.

The knowledge manager may select an update article control 176 to perform the action of updating or revising the article 56 to address the feedback. Selection of the update article control 176 may open a window with the article 56 associated with the feedback, where the opened window includes tools to facilitate the updates to the article 56 by the knowledge manager. The knowledge manager may select a delete article control 178 to perform the action of retiring the article 56 to address the feedback. In some embodiments, selection of the delete article control 178 may lead to the removal of the article from the knowledge base. In some embodiments, selection of the delete article control 178 may cause the cloud-based platform 20 to retain the article for subsequent access by some users (e.g., knowledge managers, system administrators) and to remove access to the article by other users, such as the user that provided the feedback leading to the action to delete the article. A refresh control 180 may be selected by the knowledge manager to refresh the task interface 150, such as with recent supplemental feedback provided by the user, work notes provided by another knowledge manager, or updates to other fields displayed on the task interface 150.

Figure 8:
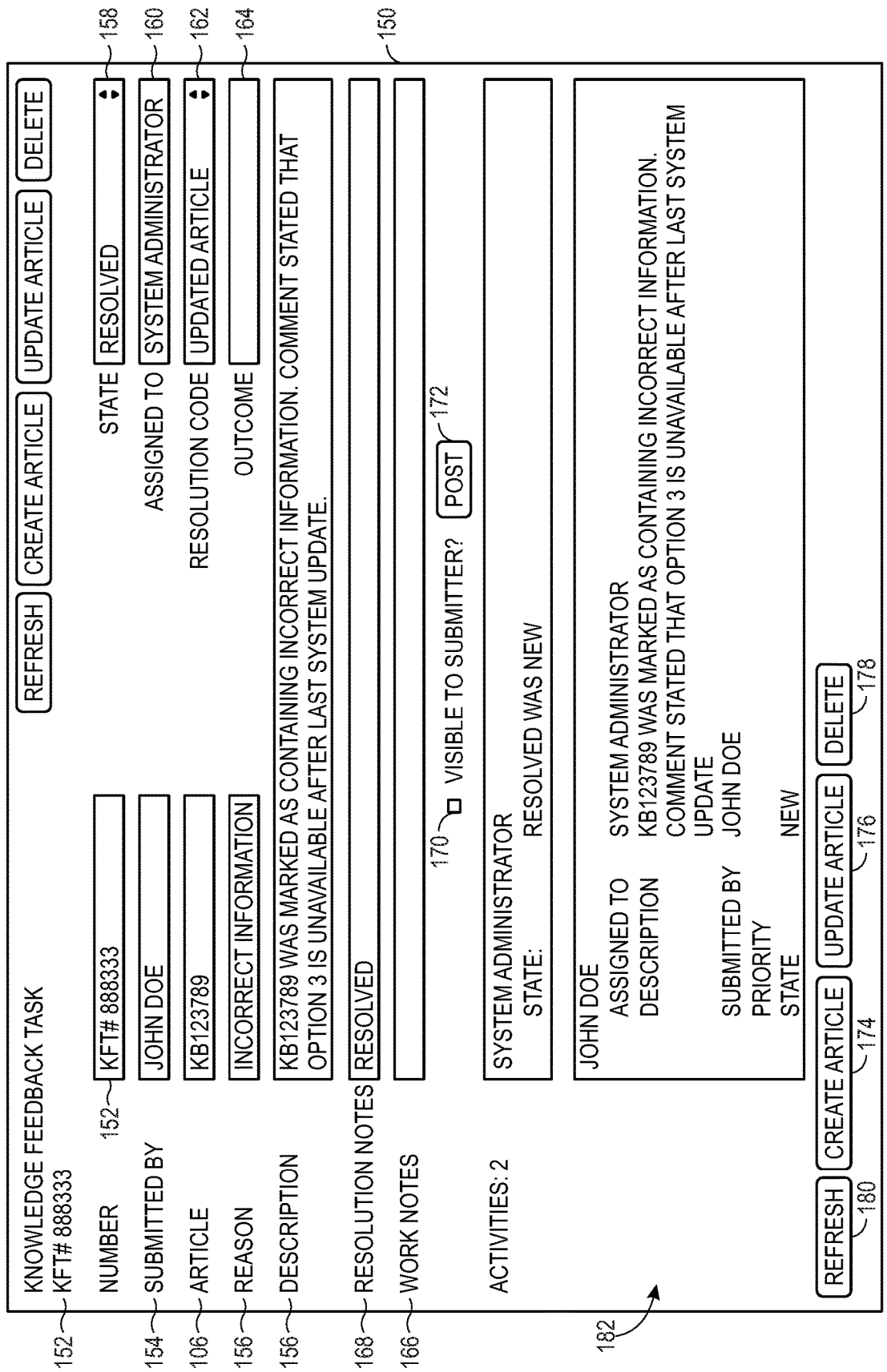
FIG. 8 is a user interface reflecting the action by the knowledge manager for the task generated based on the user feedback corresponding to the article, in accordance with an embodiment.

The task interface 150 may include an activity portion 182 that display the activities related to the task. The activities may be associated with the article 56, the feedback 58, and the task 64 in the knowledge base 50. The embodiment of the task interface 150 illustrated in FIG. 7 displays only the feedback 58 for a newly generated task 64 that has not yet been reviewed by the assigned knowledge manager. FIG. 8 illustrates an embodiment of the task interface 150 in which the activity portion 182 reflects subsequent activity (i.e., resolution of the task) by the assigned knowledge manager.

After the knowledge manager provides the action 68 to the cloud-based platform 20 via the task interface 150, the cloud-based platform 20 may notify the user that provided the feedback 58 about the action 68. FIG. 9 illustrates an embodiment of a notification interface 200 that related to the task 64 for the feedback 58 corresponding to the article 56. The notification interface 200 may include many of the fields from the task interface 150 illustrated in FIG. 9, yet the fields of the notification interface 200 may be read-only except for a notification feedback field 202. In some embodiments, the user may select a view action control 204 to view the action (e.g., new article, updated article, explanation for no other action) performed by the knowledge manager in response to the task to address the feedback. Where the action is to delete the article, the view action control 204 may be hidden or unselectable by the user. The action may be viewed within the notification interface 200 or in a new window. An activity portion 208 of the notification interface 200 may display activity related to the article 56, such as the feedback 58 by the user, the action 68 by the knowledge manager, and other updates to the article 56.

Through the notification feedback field 202 and a post control 206, the user may provide supplemental feedback corresponding to the action. In some embodiments, supplemental feedback may be processed (e.g., evaluated) to determine if the task should return to the knowledge manager for further action (e.g., supplemental action), or if a new task should be generated to address the supplemental feedback. The user may indicate approval of the action through selection of an accept control 210, or the user may indicate a rejection of the action through selection of a reject control 212. It may be appreciated that selection of the accept control 210 may cause the task state 158 to be changed to "Resolved" or "Closed," as appropriate. In some embodiments, the user may be instructed to select the accept control 210 if the action would cause the user to modify the previously provided one or more feedback inputs such that the modified one or more feedback inputs would satisfy the one or more respective task generation rules.

Figure 10:
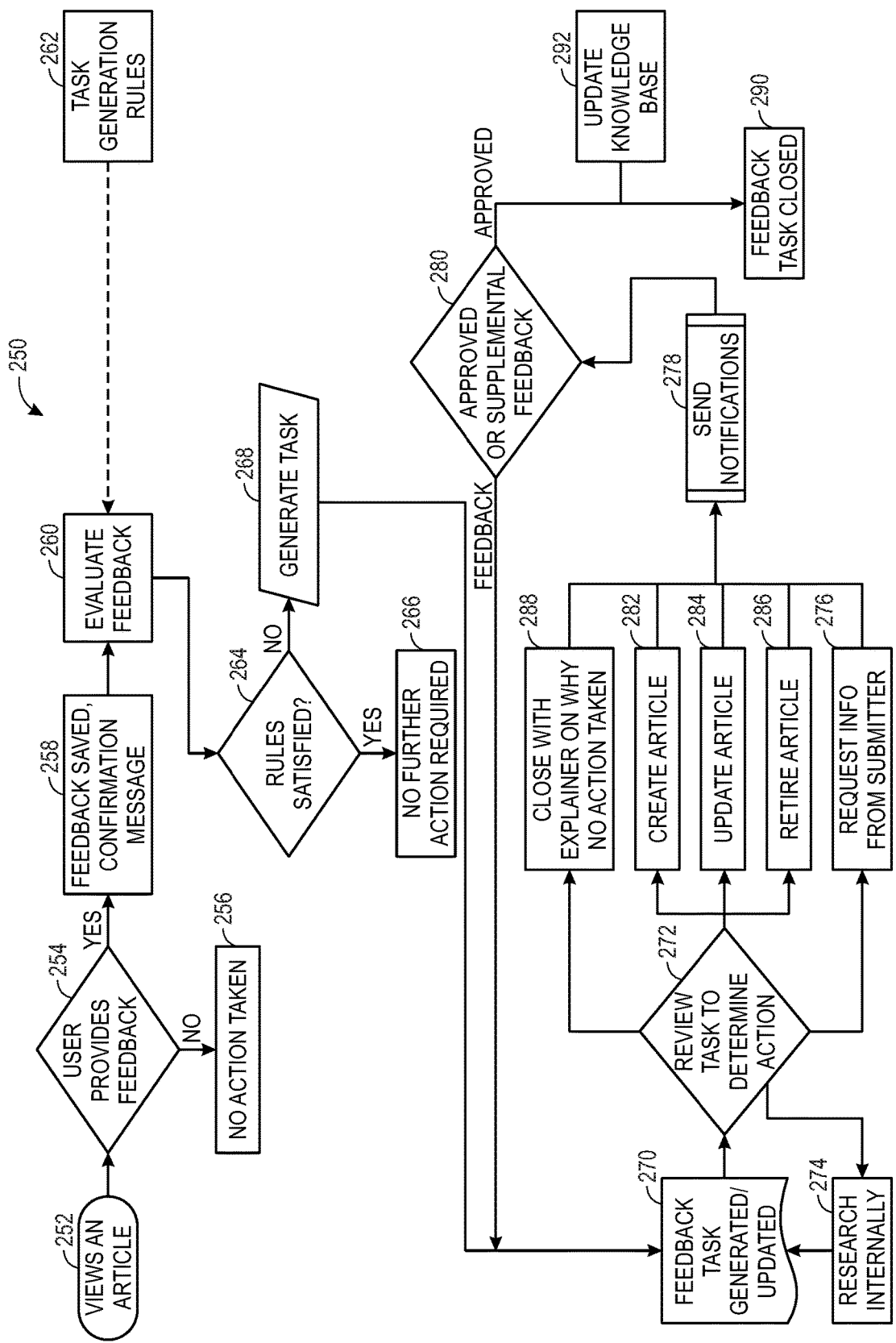
FIG. 10 is a flow chart of a process for utilizing feedback corresponding to the article from the user to generate a task for the knowledge manager to take an action that updates the knowledge base in response to the feedback corresponding to the article from the user, in accordance with an embodiment.

FIG. 10 illustrates a flow chart of a process 250 for generating a task for a knowledge manager based on feedback corresponding to an article, and updating the knowledge base with an action to address the feedback corresponding to the article from the user. A user may utilize a client device (e.g., mobile phone, computer, tablet) to view an article (block 252) accessed from a knowledge base of a cloud-based platform, as discussed above. The cloud-based platform may determine (node 254) if the user provided feedback corresponding to the article. If no feedback is provided, then no action is taken (block 256). If the user provides feedback, such as via the feedback portion 116 discussed above with FIG. 5, then one or more feedback inputs may be saved with the article (block 258). In some embodiments, a confirmation message corresponding to the provided feedback or request for supplemental feedback is communicated to the user. The one or more feedback inputs may include, but are not limited to an indication on whether an article was helpful, a rating of the article, text comments on the article, or any combination thereof. The cloud-based platform 20 may evaluate (block 260) the one or more feedback inputs with one or more respective task generation rules (item 262). If the feedback inputs satisfy the respective task generation rules (node 264), then no further action may be required by the user or knowledge manager of the knowledge base (block 266). However, if the one or more feedback inputs do not satisfy the one or more respective task generation rules, as discussed above, then the cloud platform may generate a task (block 268) for a knowledge manager to address the one or more feedback inputs. In some embodiments, generating the task may cause the article to be visibly flagged to at least the user submitting the one or more feedback inputs.

In some embodiments, the generated task (item 270) may be assigned to a knowledge manager of a plurality of knowledge managers. The generated task may include the various fields discussed above and illustrated in FIGS. 7 and 8. Upon review of the task, the knowledge manager may determine the appropriate action (node 272). In some situations, the knowledge manager may perform internal research (block 274) to better determine the appropriate action. In some embodiments, the appropriate action is to request additional information from the user that provided the one or more feedback inputs (block 276). The cloud-based platform may communicate a notification (block 278) to the user of the request for additional information, such as the request 130 discussed above with FIG. 6. As shown at node 280, the user may provide supplemental feedback via the cloud-based platform, which may update the task accordingly (block 270).

In some embodiments, the appropriate action is to create a new article (block 282) or to update the article (block 284) to address the one or more feedback inputs. The new article may be designated as a supplemental article to the base article within the knowledge base. Furthermore, the appropriate action for the knowledge manager may be to retire the article (block 286), such as in response to one or more feedback inputs that the article is incorrect or no longer relevant. As discussed above, the appropriate action to address some tasks may be to prepare an explanation (block 288) for the user that submitted the feedback why no other action (e.g., new article, updated article) is taken.

The knowledge manager may perform the appropriate action via a task interface supported by the cloud-based platform, as discussed above with FIGS. 7 and 8. In some embodiments, the cloud-based platform may communicate (block 278) a notification to the user, as discussed above with FIG. 9. As shown at node 280, the user may provide supplemental feedback or approval. If the user provides supplemental feedback, the task may be updated and provided to the knowledge manager again to address the supplemental feedback. For example, the knowledge manager may address the supplemental feedback with a supplemental action (e.g., new article, updated article, explanation of no other action, retired article). In some embodiments, supplemental feedback may generate a separate task to be assigned to the knowledge manager. If the user provides approval of the action and any supplemental actions, then the task may be closed (290). The knowledge base may be updated upon approval of the action by the user (block 292). In some embodiments, the knowledge base may be updated when the knowledge manager performs the action (blocks 276, 282, 284, 286, 288) prior to approval by the user.

The disclosed provide a system for automatically generating and assigning tasks to knowledge managers to improve a knowledge base based on feedback corresponding to articles of the knowledge base that are provided by users. Through processing of one or more feedback inputs with task generation rules, negative feedback may be identified and promptly addressed via tasks assigned to knowledge managers. In some embodiments, feedback corresponding to the article that is identified as positive feedback may be utilized to improve the ranking or rating of the article, to adjust a profile of a user of the knowledge base, or any combination thereof. Moreover, the feedback may be processed to determine the appropriate knowledge manager to address the feedback, thereby enabling a reduction in the turnaround time between when feedback is provided and when an appropriate action is performed to address the feedback. By addressing the feedback inputs that are negative, the knowledge managers may address issues or concerns of users and improve the quality, usefulness, and relevancy of the articles of the knowledge base. The user that provided the feedback may be notified when actions are performed that address the feedback, thereby improving engagement of users with the knowledge base. Additionally, the notification and engagement of the users may increase the involvement of users with the knowledge base. Furthermore, adjustment of the task generation rules over time may enable the articles of the knowledge base to be refined over time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a client instance hosted by a datacenter, wherein the client instance is communicatively coupled to one or more client networks, wherein the one or more client networks comprise a first computing device associated with a user and a second computing device associated with a knowledge manager, wherein the client instance is configured to perform operations comprising:
receiving, from the first computing device, one or more feedback inputs corresponding to an article from a knowledge base accessible via the client instance;
processing the one or more feedback inputs with one or more respective task generation rules and, in response, generating a task to address the one or more feedback inputs corresponding to the article;
providing the task to the second computing device, wherein providing the task comprises prompting the knowledge manager to provide an action for the task;
receiving, from the second computing device, the action provided by the knowledge manager for the task;
providing, to the first computing device, a notification of the action provided by the knowledge manager, wherein the notification prompts the user to accept or reject the action;
in response to receiving, from the first computing device, an acceptance of the action, updating the knowledge base based at least in part on the action and closing the task; and
in response to receiving, from the first computing device, a rejection of the action, updating the task and providing the updated task to the second computing device.

2. The system of claim 1, wherein the one or more feedback inputs comprise a rating, a helpfulness indicator, a sentiment analysis rating, or any combination thereof.

3. The system of claim 1, wherein generating the task comprises assigning the task to the knowledge manager from a plurality of knowledge managers of the knowledge base, wherein the knowledge manager is assigned the task based on at least a topic of the article, a priority of the one or more feedback inputs, an availability of the knowledge manager, or any combination thereof.

4. The system of claim 1, wherein the action comprises a creation of a new article, an update to the article, or a retirement of the article.

5. The system of claim 4, wherein, before receiving the action, the client instance is configured to perform operations comprising:
receiving, from the second computing device, a request from the knowledge manager for supplemental feedback from the user corresponding to the article;
providing the request for the supplemental feedback from the user to the first computing device;
receiving, from the first computing device, the supplemental feedback of the user; and
supplying the supplemental feedback to the second computing device, wherein the action is based at least in part on the one or more feedback inputs and the supplemental feedback.

6. The system of claim 1, wherein the action comprises an explanation why a new article or an update to the article are not generated in response to the one or more feedback inputs.

7. The system of claim 1, wherein the client instance is configured to perform operations comprising adjusting the one or more respective task generation rules based on input received from the knowledge manager via the second computing device.

8. The system of claim 1, wherein the knowledge manager is a virtual knowledge manager.

9. A a non-transitory, computer-readable medium storing instructions executable by one or more hardware processors of a first computing device, the instructions comprising instructions to:
receive, from a second computing device associated with a client network, one or more feedback inputs corresponding to an article from a knowledge base accessible by the first computing device;
process the one or more feedback inputs with one or more respective task generation rules and in response, generate a task to address the one or more feedback inputs corresponding to the article;
provide, to a third computing device associated with the client network, a request for an action to address the task;
receive, from the third computing device, the action in response to the request;
provide, to the second computing device, a notification of the action, wherein the notification includes a prompt to accept or reject the action; and
in response to receiving, from the second computing device, an acceptance of the action, update the knowledge base based at least in part on the action and close the task.

10. The medium of claim 9, wherein the one or more feedback inputs comprise a rating, a helpfulness indicator, a sentiment analysis rating, or any combination thereof.

11. The medium of claim 9, wherein the action comprises a creation of a new article, an update to the article, or a retirement of the article.

12. The medium of claim 9, wherein the instructions comprise additional instructions to:
close the task based on an elapsed time since the notification was provided to the second computing device.

13. The medium of claim 9, wherein the instructions comprise additional instructions to:
in response to receiving, from the second computing device, a rejection of the action:
update the task and provide, to the third computing device, a second request for a second action to address the updated task;
receive, from the third computing device, the second action in response to the second request;
provide, to the second computing device, a second notification of the second action, wherein the second notification includes a second prompt to accept or reject the second action; and
in response to receiving, from the second computing device, an acceptance of the second action, update the knowledge base based at least in part on the second action and close the updated task.

14. A method, comprising:
supplying an article from a knowledge base to a first computing device, wherein the knowledge base comprises a plurality of articles;
receiving one or more feedback inputs corresponding to the article from the first computing device, wherein the one or more feedback inputs comprises a text input and at least one of a rating or a helpfulness indicator;
processing the one or more feedback inputs with one or more respective task generation rules and, in response, generating a task to address the one or more feedback inputs corresponding to the article;
receiving, from a second computing device, an action in response to the generated task;
communicating a notification of the action to the first computing device, wherein the notification includes a prompt to accept or reject the action; and
in response to receiving, from the first computing device, an acceptance of the action, updating the knowledge base based at least in part on the action and closing the task.

15. The method of claim 14, wherein the one or more feedback inputs comprises a sentiment analysis rating of the text input.

16. The method of claim 14, wherein the action comprises a creation of a new article, an update to the article, or a retirement of the article.

17. The method of claim 14, wherein the action comprises an explanation why a new article or an update to the article is not generated in response to the one or more feedback inputs.

18. The method of claim 14, comprising closing the task based an elapsed time since the notification was communicated to the first computing device.

19. The method of claim 14, comprising: providing, via the second computing device, a second prompt to provide the action after generating the task.

20. The method of claim 14, comprising: in response to receiving, from the second computing device, a rejection of the action, updating the task and providing the updated task to the first computing device.

* * * * *